US007983900B2

(12) United States Patent
Moyle

(10) Patent No.: US 7,983,900 B2
(45) Date of Patent: Jul. 19, 2011

(54) METHOD, COMPUTER PROGRAM AND APPARATUS FOR ANALYSING SYMBOLS IN A COMPUTER SYSTEM

(75) Inventor: Stephen Anthony Moyle, Oxford (GB)

(73) Assignee: Oracle International Corporation, Redwood Shores, CA (US)

( * ) Notice: Subject to any disclaimer, the term of this patent is extended or adjusted under 35 U.S.C. 154(b) by 293 days.

(21) Appl. No.: 12/187,104

(22) Filed: Aug. 6, 2008

(65) Prior Publication Data

US 2009/0055166 A1    Feb. 26, 2009

Related U.S. Application Data

(63) Continuation-in-part of application No. 11/672,253, filed on Feb. 7, 2007, now abandoned.

(60) Provisional application No. 60/771,281, filed on Feb. 8, 2006.

(51) Int. Cl.
*G06F 17/27* (2006.01)
(52) U.S. Cl. ............................... 704/9; 704/257; 704/7
(58) Field of Classification Search ............... 726/2, 21, 726/23, 24, 25, 32, 35; 704/273, 274, 1–10, 704/257, 242, 270
See application file for complete search history.

(56) References Cited

U.S. PATENT DOCUMENTS 6,311,278 B1   10/2001  Raanan et al.
7,657,927 B2 *  2/2010  Tajalli et al. ...................... 726/2

FOREIGN PATENT DOCUMENTS

WO         03/090046 A2    10/2003

OTHER PUBLICATIONS

Steve Moyle and John Heasman: "Machine Learning to Detect Intrusion Strategies", published in V. Palade, R. J. Howlett, and L. C. Jain editors, 7th International Knowledge-Based Intelligent Information and Engineering Systems (KES 2003), LNAI 2663, pp. 371-378, Oxford, 2003. Springer-Verlag Heidelberg (7 page document).
S.H. Muggleton: "Learning from positive data", in S.H. Muggleton, editor, Proceedings of the Sixth International Workshop on Inductive Logic Programming (ILP-96), Lecture Notes in Artificial Intelliegence 1314, pp. 358-376, Berlin, 1996. Springer-Verlag (21 page document).
European extended search report dated Feb. 18, 2009 for Application No. EP07250432.7 (9 pages).
Article 94(3) EPC Communication date Oct. 13, 2009 for Application No. EP07250432.7 (1 pages).
Response to the Oct. 13, 2009 examination report dated Oct. 13, 2009 dated Mar. 11, 2010 for Application No. EP07250432.7 (3 pages).
Article 94(3) EPC Communication date Jun. 30, 2010 for Application No. EP07250432.7 (7 pages).
Aho, Alfred V., et al., "Compilers Principles, Techniques, and Tools", Addison-Wesley Publishing Company, Sep. 15, 1985, XP002940830, BNS pp. 1-8 and 149-161.

* cited by examiner

*Primary Examiner* — Huyen X. Vo
(74) *Attorney, Agent, or Firm* — Kilpatrick Townsend & Stockton LLP

(57) ABSTRACT

A computer-implemented method of analyzing symbols in a computer system, and a computer program and apparatus therefor are provided. The symbols conform to a specification for the symbols. The specification is codified into a set of computer-readable rules. The symbols are analyzed using the computer-readable rules to obtains patterns of the symbols by: determining the path that is taken by the symbols through the rules that successfully terminates, and grouping the symbols according to said paths.

26 Claims, 4 Drawing Sheets

METHOD, COMPUTER PROGRAM AND APPARATUS FOR ANALYSING SYMBOLS IN A COMPUTER SYSTEM

CROSS-REFERENCE TO RELATED APPLICATIONS

This application is a continuation-in-part of prior application Ser. No. 11/672,253 filed Feb. 7, 2007 now abandoned and also claims the benefit of priority to U.S. application Ser. No. 60/771,281 filed Feb. 8, 2006, the contents of which are hereby incorporated by reference in its entirety for all purposes.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

Field of Invention

There are many examples of computer systems in which it is useful to be able to analyse symbols passing through or stored in the computer system. As will be appreciated from the following, the term "symbols" in this context is to be construed broadly. In general, the term "symbols" is used herein in the broad sense as used in the field of Universal Turing Machines. For example, "symbols" includes computer messages, which term is also to be construed broadly and includes for example computer messages in a computer language (including computer instructions, such as executable programs), natural languages in computer-readable form (such as in documents, emails, etc.). "Symbols" also includes computer data in the conventional sense, i.e., typically, abstractions of real world artefacts, etc.

In one example of computer systems in which it is useful to be able to analyse symbols passing through or stored in the computer system, third parties can attempt to take control of a computer system by "hacking" the computer system. Such hacking can be carried out by exploiting the well known buffer overflow weaknesses of some computer operating systems. In another example, hacking can take place by the third party sending commands to the computer system in which the commands are correctly structured in the context of the language of the computer system, but which are intended to cause the computer system to return an error message that can be used by the third party to gain illegal access to the computer system. Attacks of this type on SQL (Structured Query Language) databases are well known and yet are difficult to defend against. SQL databases are widely used, and are used for example by e-commerce and many other websites to hold user data (such as login name and password, address and credit card details, etc.).

In another example, it may be desirable to monitor computer symbols or messages to ensure that the computer system is being used properly and that for example it is not being used inappropriately. For example, in an organisation, a user may be using a computer system inappropriately, for example by using the computer system for purposes for which the user is not authorised, and yet which is not intended by the user to be an "attack" on the computer system as such.

Known measures to prevent such inappropriate use of the computer system include the use of firewalls, virus scanning software and intrusion detection systems.

Firewalls are effective but have many limitations. For example, in e-commerce or the like, it is inevitable that third parties must have access to a web server so that for example the third parties can enter login and password details and obtain appropriate responses from the web server. In such cases, the firewall must allow users access to the computer system.

Virus scanning software is again effective, but only in respect of viruses that are already known or that have signatures that are similar to known viruses. This is because virus checkers typically monitor files to look for "signatures", i.e. known strings of bytes, which are stored in a library. In other words, virus checkers look for syntax (e.g. strings of bytes in a file) and not semantics (i.e. the content and meaning of a message or file).

Intrusion detection systems are becoming increasingly effective. However, typically these operate by analysing computer messages to determine whether they fit a set of known rules that are deemed to apply to messages that are to be accepted. A problem with this approach arises in the generation of the rules and when the intrusion detection system faces a new message that has not been seen previously. In WO-A-2003/090046, an intrusion detection system is disclosed that uses inductive logic programming to generate new rules for new messages so as to update the knowledge base of the intrusion detection system. Another example of an intrusion detection system that is similar in concept, though different in detail, is disclosed in U.S. Pat. No. 6,311,278.

A problem with these known intrusion detection systems that effectively generate new rules, which allow the intrusion detection system to determine whether or not to accept the computer message, is that the time taken to generate the new rules is generally prohibitive. For example, even a modest e-commerce site can process 10,000 SQL statements per minute. It is not possible for these known intrusion detection systems to handle that amount of traffic in a reasonable time. It will be understood that any significant delay for a user in accessing an e-commerce site will generally not be acceptable to the user, who will typically require access within seconds of attempting to log in to a website. Similarly, within for example an organisation, users will not accept any significant delays in processing their traffic across the network.

There are also many applications where it would be useful to be able to analyse symbols, including for example data and other computer messages, into patterns that can be recognised by humans. The message analysis can be used to monitor usage by users of a computer system to allow the users to be invoiced according to the amount and/or type of usage of the computer system, and generally to permit effective monitoring of usage of the computer system so that, in turn, the computer system can be managed in terms of availability and resources to meet usage requirements.

BRIEF SUMMARY OF INVENTION

According to a first aspect of embodiments of the invention, there is provided a computer-implemented method of analysing symbols in a computer system, the symbols conforming to a specification for the symbols, the specification having been codified into a set of computer-readable rules, the method comprising: analysing the symbols using the computer-readable rules to obtain patterns of the symbols by: determining a path that is taken by the symbols through the rules that successfully terminates, and grouping the symbols according to said paths.

As mentioned above, "symbols" in this context is to be construed broadly. In general, the term "symbols" is used herein in the broad sense as used in the field of Universal Turing Machines. For example, the term "symbols" includes computer messages, which term is also to be construed broadly and includes for example computer messages in a computer language (including computer instructions, such as executable programs), natural languages in computer-readable form (such as in documents, emails, etc.). "Symbols" also includes computer data in the conventional sense, i.e., typically, abstractions of real world artefacts, etc.

By analysing the symbols into patterns (which can be regarded as partitioning a data set of sequences of symbols into subsets, which are also sometimes referred to herein as "patterns" or "clusters"), new symbols can be analysed more efficiently than in prior art techniques, which makes it possible to implement the method in real-time with relatively little computational overhead.

In an embodiment, the method is carried out on new symbols to determine whether the new symbols fit a pattern of symbols that is known or constitute a new pattern of symbols. In practice, in one embodiment, if the new symbols fit a pattern that is known, then a decision will already have been made as to whether symbols fitting that known pattern are to be deemed acceptable or not. If the symbols constitute a new pattern, in practice a decision will have been made what to do with symbols that constitute a new pattern, such as "always deem not acceptable" or "send error report", etc.

In an embodiment, the method is initially carried out on training examples of symbols. This allows a base set of patterns of symbols to be built up. This base set can be analysed by a human domain expert who can for example determine which of the patterns of symbols relate to acceptable or normal behaviour, so that new symbols can be classified accordingly (e.g. that the new symbols fit a pattern that is known and can therefore be deemed acceptable or not, or the new symbols constitute a new pattern and should therefore for example be deemed not acceptable). In principle, the training examples may be examples of symbols that are known to be acceptable thereby to obtain patterns of symbols that are known to be acceptable. However, more likely in practice is that the training examples will be general and a decision will be made later, after the patterns of symbols have been produced and based on the patterns of symbols, as to which patterns of symbols are to be deemed acceptable or not.

In an embodiment, it is determined to be sufficient to take only a single said path that successfully terminates. As will be explained further below, this improves the efficiency of the method.

In a preferred embodiment, the specification is codified by defining a first order logic that describes the specification; and, the symbols are analysed using the first order logic to obtain patterns of the symbols by: determining a path that is taken by each symbol through the first order logic that successfully terminates, and grouping the symbols according to said paths.

The use of first order logic provides for a particularly efficient method and one that is comparatively easy to implement.

In a preferred embodiment, the first order logic has clauses at least some of which are parameterised. In other words, some of the clauses have labels applied thereto, the labels relating to the probability of the clause being "true" in the context of the computer system in which the symbols are passing.

Preferably, at least some of the clauses have a head that is parameterised, the determining step in the analysing step being carried out by determining a path of clauses having a parameterised head through the first order logic that is taken by each symbol that successfully terminates. As will be explained further below, this improves the efficiency of the method.

In a most preferred embodiment, the first order logic is a stochastic logic program having at least some clauses that are instrumented, the determining step in the analysing step being carried out by determining a path of said instrumented clauses through the first order logic that is taken by each symbol that successfully terminates.

In another embodiment, the specification is codified into a Java program; and, the symbols are analysed using the Java program to obtain patterns of the symbols by: determining an execution path that is taken by each symbol through the Java program that successfully terminates, and grouping the symbols according to said execution paths.

In an embodiment, the symbols are messages of a computer language, said specification being the computer language, and wherein the codifying the specification into a set of computer-readable rules comprises defining computer-readable rules that describe the grammar of the computer language.

In another embodiment, the symbols are data.

In an embodiment, the method comprises generalising the symbols by generalising to the paths. This allows generalisation to be tractable. In this context, generalisation means that the sequences of symbols with the same path are considered to belong to a generalised group of sequences.

In an embodiment, the method comprises, prior to the analysing, codifying the specification into the set of computer-readable rules.

According to a second aspect of embodiments of the invention, there is provided a computer program for analysing symbols in a computer system, the symbols conforming to a specification for the symbols, the specification having been codified into a set of computer-readable rules, the computer program comprising program instructions for causing a computer to carry out a method of: analysing the symbols using the computer-readable rules to obtains patterns of the symbols by: determining the path that is taken by the symbols through the rules that successfully terminates, and grouping the symbols according to said paths.

There may also be provided a computer programmed to carry out a method as described above.

BRIEF DESCRIPTION OF THE DRAWINGS

Embodiments of the invention will now be described by way of example with reference to the accompanying drawings, in which.

DETAILED DESCRIPTION OF THE INVENTION

Figure 1:
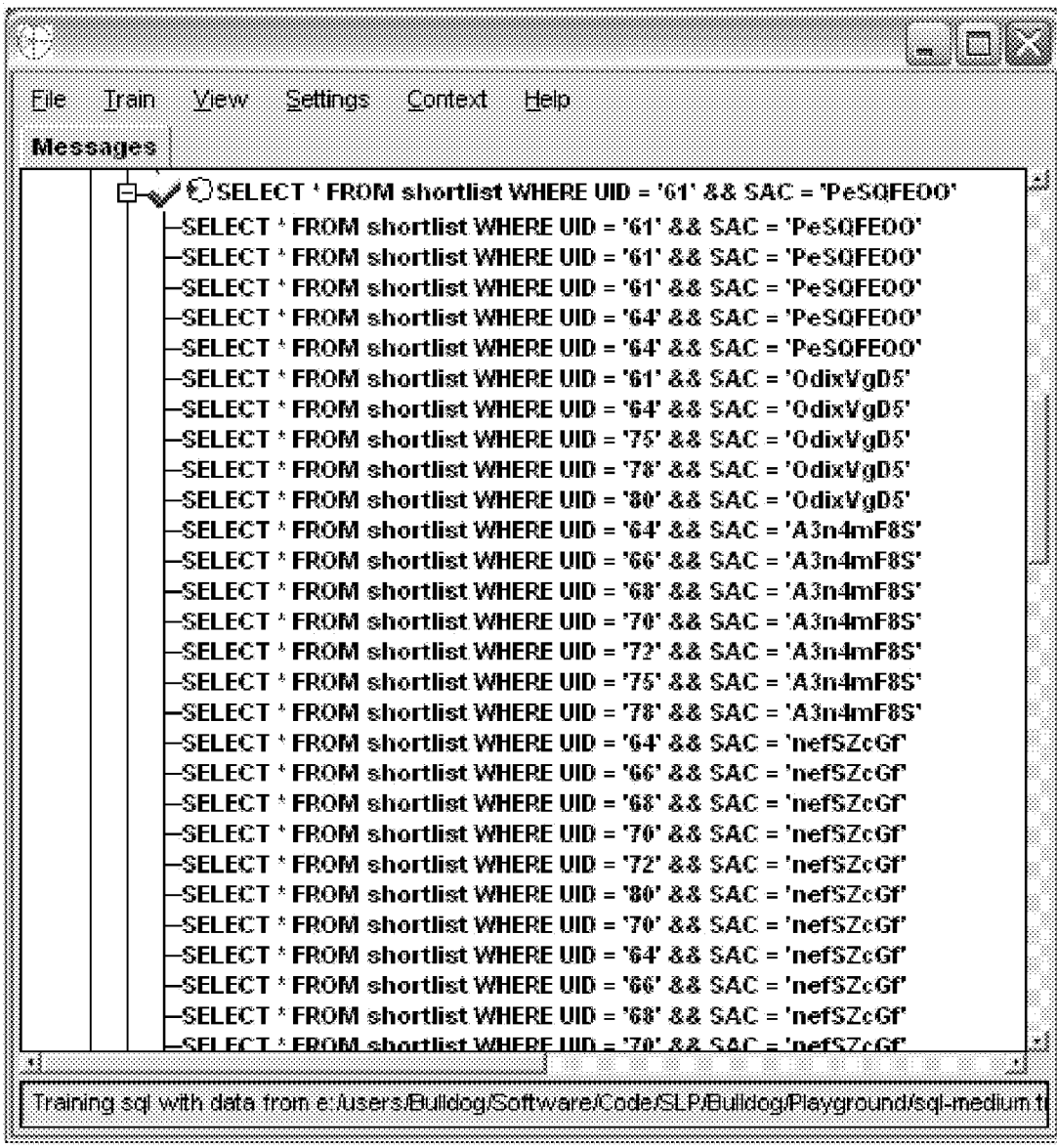
FIG. 1 shows an example of a cluster obtained in accordance with an embodiment of the invention.

In the immediately following specific description, reference will be made principally to computer messages written in a computer language, and to the use of first order logic including stochastic logic programs in particular. However, as will be appreciated from the foregoing and as explained further below, the symbols that are analysed can in general be of any type that conforms to a specification and that techniques other than first order logic may be applied.

In a computer system, messages are used to specify the desired operational behaviour of components in the computer system. Thus, messages are used between components within the computer system, and messages are used by users to gain access to the computer system. High level or "scripting" languages are used to facilitate the use of messages in a computer system. The computer language is defined by a grammar so that the messages conform to a known syntax. The grammar of such computer languages is published so that software developers can ensure that the messages of the software conform to the correct syntax. By way of example only, the syntax for the SQL language is published as an ISO standard (for example the document series ISO/IEC 9075).

The preferred embodiments of the invention operate by analysing new messages to determine whether the new messages fit a pattern of messages that is deemed to be acceptable. In this context, a message is "new" if it has not been seen by the system previously.

In contrast to the prior art briefly discussed above, the preferred embodiments are not concerned with generating new rules for new messages, and instead, as stated, are concerned with determining patterns for computer messages. The patterns that are obtained can then be considered, for example by visual inspection, "manually" by a human user, to determine for example whether a computer system has been compromised or could be compromised. In this context "compromised" includes, but is not limited to, virus infections or unauthorised access of data. Alternatively, the patterns can be automatically analysed by a computer-implemented method, so that messages can be accepted or rejected, preferably effectively in real time and therefore "on the fly".

In the preferred embodiment, the grammar of the computer language of the messages that are to be analysed is defined using first order logic. This may be carried out in a manner that is known per se. For example, the programming language Prolog can be used to describe the grammar of the computer language as a set of first order logic. This grammar as first order logic is then applied initially to a set of training examples of messages. Such training examples of messages are defined so as to be correct syntactically in the context of the computer language and appropriate in the sense that they are messages that are deemed to be "acceptable" in the context of usage of the computer system around which the messages pass. The formal language term "acceptable" in this context means that the messages are grammatically correct rather than necessarily being safe for the computer system. The first order logic contains clauses. When the first order logic is applied to the messages, a series of the clauses (termed a "path") analyses the messages. The identity of the clauses along a success path is noted. A success path is a path of clauses that terminates in the process of accepting the message in the grammar. In this way, the success paths of acceptable messages through the first order logic are obtained. These success paths can then be grouped (or "clustered") according to similarity. In turn, the messages that follow the respective success paths can be grouped according to similarity in this sense, so that patterns of similar messages can be discerned. This means that new messages, which are different from messages used in the training, can then be allocated to patterns of messages that are known to be acceptable, or rejected.

The success paths taken by different computer messages are determined to be similar when, for example, the success path taken by the different computer messages are identical. Furthermore, in a preferred embodiment, an indication of a further level of similarity may be obtained by determining which of the success paths can themselves be considered to be similar to each other. This may be achieved by for example using a Least General Generalisation (LGG) technique on the success paths, this method being known from for example G. D. Plotkin: "Automatic Methods of Inductive Inference", PhD Thesis, Edinburgh University, 1971, in which the values of symbols occurring in the same part of a logical structure can be abstracted into a reference for any symbol value.

In the preferred embodiment, some of the clauses of the program logic are annotated with probabilities of the clauses being true in the context of the messages in the computer system. By appropriate labelling of these annotated clauses, a very efficient system for analysing the messages into patterns can be obtained. The preferred embodiment uses logic in the form of a stochastic logic program.

In general, for an arbitrary stochastic logic program, it is non-trivial to calculate the correct labels to be applied to the annotated clauses based on the stochastic logic program and a set of training examples so that the population that the stochastic logic program represents has the same probability of being generated as the original training examples. For example, a naïve way to build up the labels on the annotated clauses in the stochastic logic program is to count every time that each clause "fires" (i.e. the clause is determined to be "true") when applying the training examples. There are however two immediate problems with this simple approach. First, it may be that there are several success paths through the logic when applying the logic to a particular example, which can cause multiple counting of the same clauses and/or undercounting of the same clauses. Secondly, some clauses will still fire and therefore be counted even when the final derivation of the goal along a path of clauses fails (i.e. the path is not terminated and there is no success path for this example). Whilst techniques are available for minimising these problems, this naïve method is still nevertheless computationally intensive and therefore cannot successfully be used in practice.

Before discussing specific examples of embodiments of the invention in more detail, a more formal discussion of some aspects of the preferred embodiment will now be given.

A logic program P is a conjunction of universally quantified clauses $C_1, \ldots, C_n$. Each clause is a disjunction of literals $L_k$. A goal G is a disjunction of negative literals $\leftarrow G_1, \ldots, G_m$. A definite clause is a clause with at most one positive literal (which is known as the head). A definite logic program contains only definite clauses. All clauses in a logic program with heads having the same predicate name and arity make up the definition of the clause.

A stochastic logic program (SLP) is a definite logic program where some of the clauses are parameterised with numbers. In other words, an SLP is a logic program that has been annotated with parameters (or labels). A pure SLP is an SLP where all clauses have parameters, as opposed to an impure SLP where not all clauses have parameters. A normalised SLP is one where parameters for clauses that share the same head predicate symbol and arity sum to one. If this is not the case, then it is an un-normalised SLP. Clauses having parameters are sometimes referred to herein as "parameterised clauses".

As will be understood from the following more detailed description, the preferred embodiments can be regarded as a parser that is an un-normalised stochastic logic program, i.e. only a subset of the definitions or clauses have parameters, and the parameters for any definition do not sum to one.

As has been mentioned, typical approaches to fitting an SLP to a group of examples call each example in the presence of the SLP. Fitting is the process of determining the correct values to assign to the clauses that have parameters. Each time a parameterised clause is called by the example, its firing count is incremented. Once all of the examples have been processed, the firing counts for each of the parameterised clauses are then summed and the labels that are given to the parameterised clauses are normalised versions of the firing counts. (In particular, for predicate definition Pi with parameterised clauses C1 ... CN, with firing counts F1, ..., FN, the label for Cj is Fj/sum(F1, ..., FN).) However, again as mentioned, the runtime overhead of keeping track of the parameterised predicate definitions is significant, particularly given the problem of what to do when the firing clauses do not lead to a successful derivation for the example. This is overcome in the preferred embodiment by making the assumption that only single success paths are important in accepting a particular message. This means that only the first successful derivation path through the SLP needs to be recorded. It is not necessary to take into account any other or all other successful derivation paths when calculating the parameters to be applied to the clauses of the SLP. This assumption of using single success paths through the SLP contributes to making the method more efficient. Taking only a single (the first) success path is sufficient in the present context because the principal purpose is to cluster the messages with respect to the grammar.

Another contributor to the efficiency of the preferred embodiment is the use of so-called "instrumentation". In particular, the heads of certain clauses are parameterised, which is referred to herein as "instrumented". This instrumentation can be performed at compile time. In an example, each clause that is part of a definition to be labelled is expanded at compile time, and an additional instrumentation literal slp_cc/1 is placed immediately after the head of the clause. The additional literal is also termed the "clause identifier".

For example the clause p(X):-r(X). will be compiled to p(X):-slp_cc(5), r(X). say (where it is the fifth clause to be instrumented by the compiler).

An example of a relevant compiler code snippet for producing the instrumentation and written in Prolog is shown below:

```
slp_clause(File, '$source_location'(File, Line):Clause) :-
    slp_clause(File, Line, Label, Clause0),
    expand_term(Clause0, Clause1),
    gen_cid(File, N),
    assert_label(Label, N, File),
    (   Clause1 = (Head :- Body0)
    ->  Clause = (Head :- slp_cc(N), Body),
        slp_body(Body0, Body, File)
    ;   Clause = (Clause1 :- slp_cc(N)),
        Clause1    = Head
    ),
    general_term(Head, Def),
    assert(cid_def(N, File, Def)).
```

Data structures for keeping track of compiled clauses, their Prolog modules, and the context in which they are being called at runtime are initialised by the compiler.

The main objective of this aspect of the preferred embodiment is to collect the sequence of all instrumented predicates (by noting the firing of clause identifiers) that were used in the successful derivation of a goal G. (In this context, the goal G corresponds to the message or other symbol that is to be analysed. When the goal G is called with respect to the SLP, either the goal G will be successfully derived (i.e. the message or other symbol is a "valid" message or symbol) or not. Any non-deterministic predicates that were tried and failed in the process are ignored: only the first successful derivation is used in accordance with the assumption discussed above (though backtracking is not prohibited by the methods described herein). The term non-deterministic in this context is known in logic programming and means that a goal can possibly be derived in more than one way.

The preferred runtime system makes use of extensions to the standard Prolog system called global variables. Global variables are efficient associations between names (or "atoms") and terms. The value of the global variables lives on the Prolog (global) stack, which implies that lookup time for the value of global variables is independent of the size of the term. The global variables support both global assignment (using nb_setval/2) and backtrackable assignment using (b_setval/2). It is the backtrackable assignment of global variables that are most useful for the present preferred runtime system.

The runtime system (being the program compiled into an executable form) with the instrumentation works as follows. When a goal G is called using slp_call/1, a global variable slp_path is created to store the sequence of successful instrumented predicates. When an instrumentation literal or "clause identifier" slp_cc/1 is called, the path so far is retrieved from the global variable slp_path to which the clause identifier is added before the global variable slp_path is updated. The clause identifier identifies the successful instrumented clause. All of the additions of the clause identifiers are backtrackable should any subsequent sub-goal fail.

An example of the kernel of the runtime system is shown below:

```
/******************************
 *       CALLING       *
 ******************************/
%   slp_call(:Goal, -Path)
slp_call(Goal, Path) :-
    b_setval(slp_path, [ ]),
    Goal,
    b_getval(slp_path, Path).
/******************************
 *    INSTRUMENTATION    *
 ******************************/
slp_cc(Clause) :-
    b_getval(slp_path, P0),
    b_setval(slp_path, [Clause|P0]).
slp_id(SetID, IdentifierValue) :-
    b_getval(slp_path, P0),
    b_setval(slp_path, [id(SetID, IdentifierValue)|P0]).
(The slp_identifier/2 literal will be discussed below.)
```

For example, consider a parser expressed as an SLP in accordance with a preferred embodiment of the invention that is written to accept SQL statements as a Prolog module sql. The SQL grammar as published has several hundred clausal definitions. In one example of the preferred method, the following eleven clausal definitions of the SQL grammar are defined (by a human operator) as being worthy of instrumenting:

```
:-slp
    select_list//0,
    derived_column//0,
    join//0,
    expression//0,
    query_specification//0,
    derived_column//0,
    set_quantifier//0,
    column_name_list//0,
    expression_list//0,
    show_info//0,
    cmp//0.
```

The SLP can be used to determine the path of the derivation of the parse of a message in the following manner:

```
?- slp_call(parse(
    "select * from anonData where anonID = 'nX19LR9P'"
    ), Path).
Path = [21, 26, 17, 20, 19, 13, 12, 4]
```

The numbers returned in the path sequence are the clause identifiers for the instrumented predicate (given in reverse order). In other words, by applying the SLP to the message, the identity of the clauses along the success path through the SLP can be obtained (and are written to the variable "Path"). This allows the path to be clustered with other similar paths. During training time, when the messages to which the system is applied are training examples, this "clusters" the messages into groups or sets of syntactically similar messages, irrespective of the semantics or content of the messages. (It will be understood that the patterns or clusters of any particular example will depend on the precise training examples that are given to the system during the training period and the instrumentation given to the program during compile time.) During runtime, messages are similarly analysed and effectively allocated to the patterns obtained during the training stage at training time. Significantly in the present context, even new messages, which literally have not been seen by the system previously, are allocated to the patterns obtained during the training stage. Thus, this provides the important feature of analysing messages in the computer system into patterns, even if the messages are new.

In a practical example, the overhead of the instrumentation on the runtime system has been found to be low compared with prior art approaches.

One weakness of associating normalised firing counts with probability distributions is that of "contextualisation". A good "fit" of probabilities would be when the observed path frequencies match that of the so-called Markov chain probabilities of the success paths, where the Markov chain probabilities are calculated by the product of the observed individual clause labels in a path. For example, consider a parser with a "terminal" that is an integer, that is being used in accepting log items from syslog that records DHCPD messages. (A terminal symbol is a symbol that actually occurs in the language concerned.) The integer terminal could appear in any of the date, time, and IP address portions of the messages, all of which in general end in an integer. It has been found that the fit between firing counts and calculated Markov chain probabilities is poor in such circumstances where instrumented terminals belong to different contexts. It has also been found that the Markov chain probabilities fit the observed path probabilities in situations where there are no such context ambiguities. The context of the particular terminal is "lost".

To at least partially remedy these effects, the preferred embodiment uses set identifiers. These are terms that are defined to belong to a particular set.

For example, consider a portion of an SQL parser (written as a Definite Clause Grammar or DCG) where it is determined that elements of the sets "table" and "column" are of interest. The slp_identifier/2 literal specifies the set name (either "table" or "column" in this case), and the value to associate with the set.

```
table_name -->
    [ delimited(TName), period, delimited(CName) ],
    { concat_atom([TName, '.', CName], Name),
      slp_identifier(table, Name) }
    !.
table_name -->
    [ identifier(Name) ],
    { slp_identifier(table, Name) }.
column_name -->
    [ identifier(Name) ],
    { slp_identifier(column, Name) }.
```

In the same manner as clause paths are generated using firing clauses as described above, such paths are augmented with their set name-value pair when set identifiers are used. The runtime system for this again uses backtrackable global variables to keep track of the set name-value pairs for successful derivations. (The use of a slp_identifier/2 literal is shown in the example of the kernel of the runtime system given above.)

If the previous SQL example is run again but with the slp_identifiers above installed, the following is obtained:

```
?- slp_call(
    parse(
    "select * from anonData where anonID = 'nX19LR9P'"
    ), Path).
Path =
    [21, 26, id(3, anonID), 17, 20, 19, id(2, anonData), 13, 12, 4]
```

The element id(3, anonID) says that the set number 3 (corresponding to items of type "column") contains the set value anonID.

It will be understood that the clause paths that are obtained represent a form of generalisation from the training examples. From a textual parsing perspective, in this example this generalisation can be seen to provide a mapping from a string of ASCII characters (the SQL statement) to tokens and, with respect to a background-instrumented parser, a mapping to clause paths. In the preferred embodiment, the clause paths may include SLP identifier set name-value pairs as discussed above. Each clause identifier maps to a predicate name/arity. In this sense, a predicate is a family of clauses. A clause path can be further generalised to a variable "predicate path" where clause identifiers are replaced with the name/arity of the predicate to which they belong. It will be obvious to someone skilled in the art that this is only one form of generalisation or mapping and that this invention is not limited only to this possibility.

Given that the messages in their raw textual form are reduced to sequences in the preferred embodiment, it is then possible to perform traditional generalisation techniques more efficiently because it is possible to generalise to the paths rather than to the whole Prolog program that describes the computer language. For example, the known "least general generalisations" method according to Plotkin (referred to above) can be used. Given that in the preferred embodiment the messages are represented as simple "atoms", the least general generalisations can be carried out in a time that is proportional to the length of the sequence. In general, the maximum time required to carry out this known least general generalisation is proportional to the maximum sequence length and exponential in the number of examples.

In summary, the preferred embodiments allow messages to be analysed to cluster the messages into patterns. A human domain expert can then inspect the patterns of messages to decide which are to be regarded as "normal" and therefore acceptable, and which are to be regarded as "abnormal" and therefore not acceptable.

To simplify this analysis by humans, and given that the paths in the respective clusters are not particularly understandable to humans, the clusters can be portrayed with a single exemplar, and the user given the ability to drill down into the examples that belong to the cluster. This has been shown to communicate the cluster and its properties effectively to human users. An example of this is shown in FIG. 1 where a cluster is portrayed by an exemplar (at the top of the list), with further examples belonging to the cluster being shown below.

Figure 2:
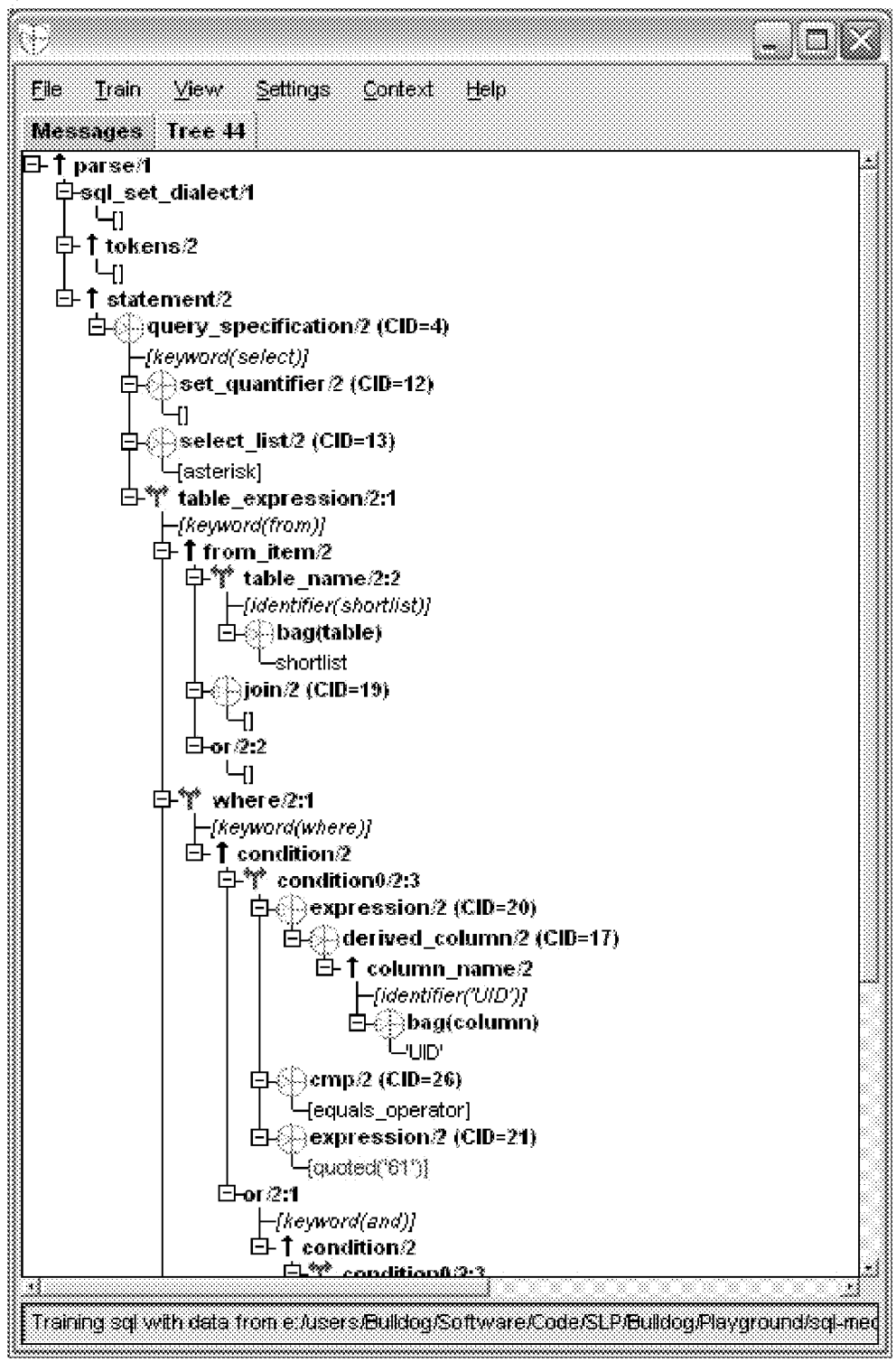
FIG. 2 shows a cluster as portrayed by its annotated parse tree.
Figure 3:
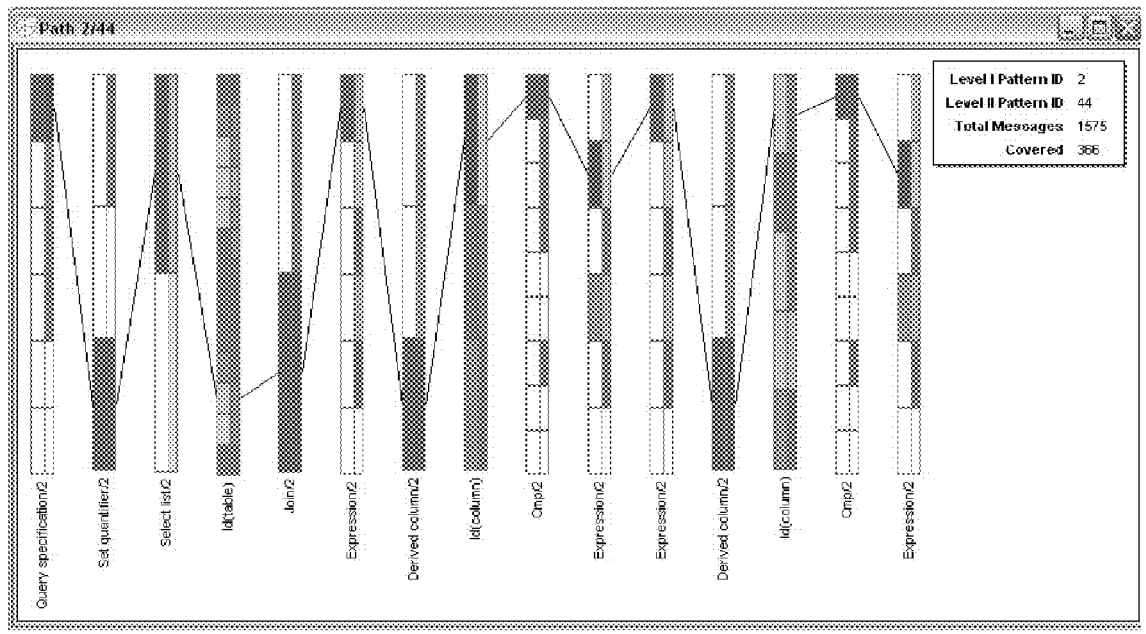
FIG. 3 shows a cluster as portrayed graphically by way of a parse map.

The paths behind the clusters can also be shown to users. For example, FIG. 2 shows a cluster as portrayed by its annotated parse tree. In another example, the paths behind the clusters can be shown graphically by way of a parse map, an example of which is shown in FIG. 3.

It is possible to extend the mappings described above, particularly the use of set identifiers for contextualisation. For example, generalisations of interesting or key predicates can be defined. To illustrate this, the example given below considers how query specifications interact with particular tables:

```
:-    classify
      query specification//0,
      id(table).
```

Figure 4:
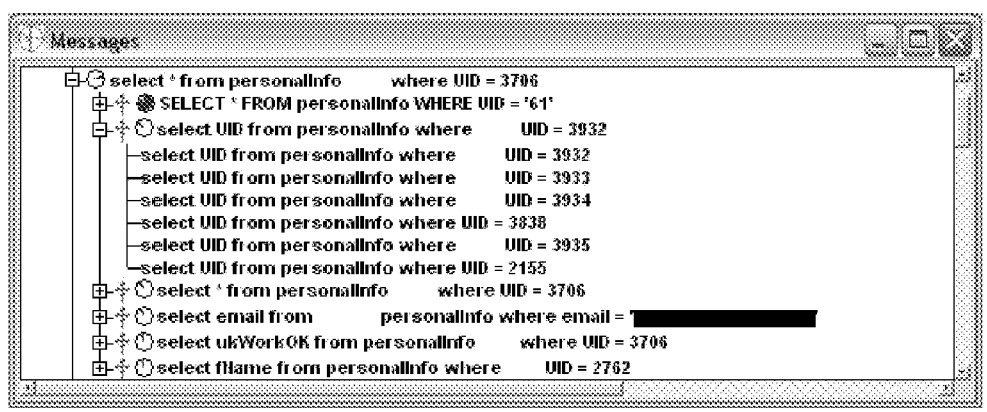
FIG. 4 shows another example of portrayal of clusters.

The result of this is shown in FIG. 4, where different access methods to a table called "PersonalInfo" are shown in their clusters.

Figure 5:
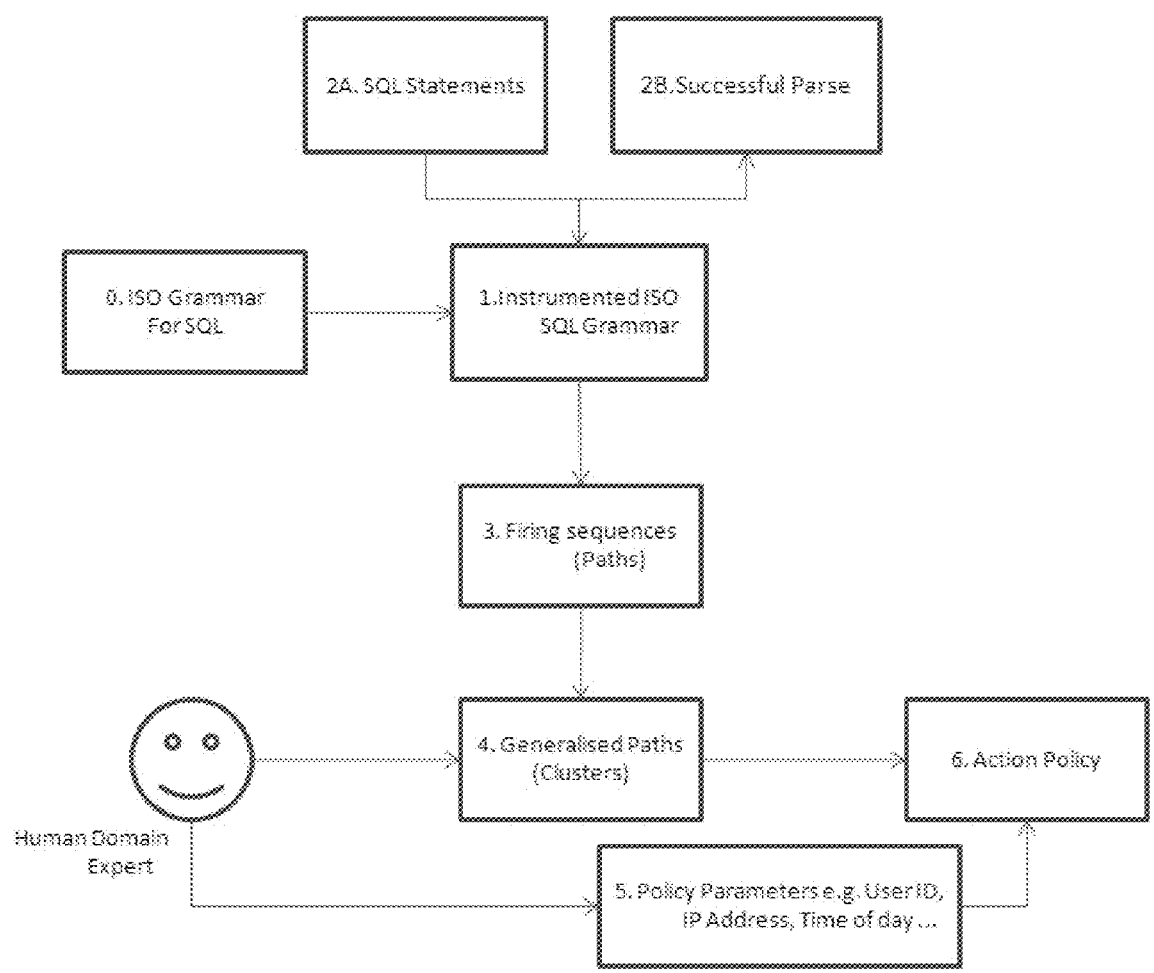
FIG. 5 shows a flow chart that indicates schematically an example method of analysing SQL statements according to an embodiment of the invention.

With reference to FIG. 5, a detailed description will now be given of an example of an embodiment of the invention that concerns the analysis of messages written in the computer language Structured Query Language (SQL). In short, messages (which, in the context of SQL, are more typically referred to as "SQL statements") are either grammatically correct or not.

In step 0, the SQL grammar is provided as an executable form of a BNF ("Backus-Naur Form") specification written as a definite clause grammar (a form of Prolog syntax). The following block provides an example of code to parse the statement from a sequence of tokens extracted from the statement:

```
statement -->
    query_specification,
    ( [ semicolon ]
    ; [ ]
    ).
query_specification -->
    [ keyword(select) ], !,
    select_body.
query_specification -->
    [keyword(insert), keyword(into) ], !,
    table_reference,
    insert_columns_and_source.
query_specification -->
    [ keyword(update) ], !,
    table_reference,
    [ keyword(set) ],
    update_set,
    where.
query_specification -->
    [ keyword(delete) ], !,
    table_expression.
```

The executable parser from step 0 is then instrumented with the following compiler directives:

```
:- slp
    select_list//0,
    derived column//0,
    join//0,
    expression//0,
    .  query_specification//0,
    derived_column//0,
    set_quantifier//0,
    column_name_list//0,
    expression list//0,
    show_info//0,
    cmp//0.
```

The compiled form of the instrumented parser specification results in an instrumented ISO SQL grammar, which is executable and will process SQL statements as inputs (step 2A) resulting in outputs of a successful parse or not (step 2B).

Bearing in mind that a training phase using training examples of messages is initially employed in the preferred embodiment, an example of a training message or statement is "select * from anonData where anonID='nX19LR9P'". The example training message is executed by the instrumented ISO SQL grammar (step 1) to produce a successful parse (step 2B) and also to emit the firing sequence (i.e. the "path") (step 3) of the instrumentation points in the instrumented ISO SQL grammar (step 1).

```
?- slp_call(parse(
    "select * from anonData where anonID = 'nX19LR9P'"
    ), Path).
Path = [21, 26, 17, 20, 19, 13, 12, 4]
```

As mentioned above, the numbers returned in the path sequence are the identifiers of the clauses for the instrumented predicate (given in reverse order).

The path (step 3) is then further generalised to produce a cluster (step 4). All statements that produce the same cluster when parsed by the instrumented ISO SQL grammar (step 1) are then presented to the human domain expert. Reference may be made to FIG. 1 for an illustration of what the human domain expert is presented with in one embodiment of the present invention.

The human domain expert can further select (step 5) other attributes of the SQL statements that are in the same cluster in order to specify an action policy (step 6). Such attributes may include (but are not limited to): User ID, IP Address, Time of Day. Subsequent SQL statements when they arrive can have the appropriate action taken as determined by the action policy (step 6). Actions might be (but are not limited to): pass the SQL statement to the database, block the SQL statement from the database, send an alert to another system whilst sending the SQL statement to the database, replace the SQL statement with an alternative SQL statement and send the alternative SQL statement to the database.

So, for example, a known mode of attack on databases is by use of a technique known as "SQL injection". In this, a hacker or the like, who is attempting illegitimately to access an e-commerce database or the like, instead of sending for example a statement "select * from anonData where anonID='nX19LR9P'", sends a statement like "select * from anonData where anonID=''union select * from creditcards--'" (which is intended to cause the database to return details of credit cards held by the database).

As noted above, processing the statement "select * from anonData where anonID='nX19LR9P'" using the instrumented parser produces a particular output path, say Path1:

```
?- slp_call(parse(
    "select * from anonData where anonID = 'nX19LR9P'"
    ), Path1).
Path1 = [21, 26, 17, 20, 19, 13, 12, 4]
```

On the other hand processing the statement "select * from anonData where anonID=''union select * from creditcards--'" using the instrumented parser produces a different output path, say Path2:

```
?- slp_call(parse(
    "select * from anonData where anonID = '' union    select * from creditcards --'"
    ), Path2).
Path2 = [19, 13, 12, 4, 33, 21, 26, 17, 20, 19, 13, 12, 4]
```

Thus, the grammatical cluster to which the first statement belongs is denoted by Path1 and the grammatical cluster to which the second statement belongs is denoted by Path2. As can be seen, Path1 and Path2 are easily determined as being unequal. Such an inequality may be configured by the human domain expert to trigger an action, such as: alert, block the statement from passing to the database, or replace the statement that generates Path2 with an acceptable statement before passing the acceptable statement to the database.

Another application of the preferred methods is to monitor usage by users of a computer system to allow the users to be invoiced according to the amount and/or type of usage of the computer system, and/or generally to permit effective monitoring of usage of the computer system so that, in turn, the computer system can be better managed in terms of availability and resources to meet usage requirements.

For example, components of distributed computer systems interact with one another by passing messages between each component. Messages can be for example requests for the component receiving the message to perform some process or activity on behalf of the component from which the message originated. The messages can contain commands or carry data or both.

In a particular example, the adoption of massively mobile and distributed computing components are known as "cloud computing", which can be regarded as an automatically managed, flexible shared computing infrastructure where consumers of computing services interact via an application programming interface (API) with a pay-per-use model. The economics of cloud computing are favourable, but there are numerous challenges. Two key challenges are security and charging on a pay-per-use model. The specification of the APIs used by cloud computing are published in advance in the form of a language specification. Users or consumers of the "cloud" will interact with the API by sending and receiving messages to/from the cloud. By analysing the messages using the presently preferred methods, it is possible to build accurate usage patterns of consumers of the cloud computing services. Such patterns can be used to provide security by insisting that only messages that conform to policy are allowed into the cloud environment, as discussed generally above. Such patterns can also be used to monitor and meter usage by the consumers. Accurate metering allows accurate accounting and charging to be provided to the consumer on a pay-per-use model.

Thus, in an example, the consumer and the service provider monitor the consumer's usage of the API and use the methods described herein to build a payment model. The payment model may be simply specified for differential payment terms. For example, when a purchase order is inserted into the cloud service, the agreed charge might be one unit. As described above, the parsing of the symbols used when calling the API uniquely identifies which of the grammatical clusters has been determined. Instead of block/alert/warn as in the context of a security system, such as an intrusion detection system as described above, the action on the next appearance of a request that fits the cluster will be of the type "bill consumer 1 unit"; "reduce remaining quota level by one"; "redirect the consumer's request to another (possibly cheaper) service provider)"; "replace the consumer's request with an alternative request"; etc.

Usage metering can be applied by recording the precise cluster of functionality requested and received with respect to the API requests and responses. Quotas can be enforced by alerting users when sending/receiving messages. When clusters of requests have been fully utilized, then the service availability would cease.

A natural extension to this is that if the cost per use for a service is accurately known, then the resources to provide the service are also accurately known. Thus, the run-time usage of the entire cloud can then be used to forecast peaks and troughs in load, in turn enabling better use of the cloud's virtualisation to provision more resources or free up resources for other tasks.

It will be understood that the application of the invention to usage monitoring is not restricted to its use in cloud computing and that it has many varied applications, including for example to "software-as-a-service" and the more generic concept of "everything-as-a-service".

In summary, given the language or similar definition of the specification for the data, the preferred embodiments initially use training examples to cluster computer messages or other data into groups or patterns of the same or similar type. New messages can then be clustered to determine whether they fit one of the patterns. A human expert will for example decide which of the patterns are regarded as normal and which are abnormal. In an intrusion detection or prevention system, this can then be used to accept or reject new messages accordingly. In another example, the message analysis can be used to build models of normal usage behaviour in a computer system. This can be used to audit past behaviour, as well as to provide active filters to only allow messages into and out of the system that conform to the defined model of normality. The message analysis can be used to monitor usage by users of a computer system to allow the users to be invoiced according to the amount and/or type of usage of the computer system, and generally to permit effective monitoring of usage of the computer system so that, in turn, the computer system can be managed in terms of availability and resources to meet usage requirements. The techniques can be applied to obtain patterns from any type of data that conforms to a known specification. This includes for example data such as financial data, including data relating to financial transactions, which allows models of usage patterns to be obtained; so-called bioinformatics (e.g. for clustering sub-sequences of DNA); natural language messages, which can be used in many applications, e.g. the techniques can be used to form a "spam" filter for filtering unwanted emails, or for language education; design patterns for computer programs, engineering drawings, etc.

The use of stochastic logic programs that are instrumented as described herein for the preferred embodiments leads to very efficient operation, making real time operation of the system possible with only minimum overhead. However, as mentioned, other techniques are available.

It will be understood that the methods described herein will typically be carried out by appropriate software running on appropriate computer equipment. The term "computer" is to be construed broadly. The term "a computer" or similar may include several distributed discrete computing devices or components thereof. The computer program may be in the form of source code, object code, a code intermediate source and object code such as in partially compiled form, or in any other form suitable for use in the implementation of the processes according to the invention. The carrier may be any entity or device capable of carrying the program. For example, the carrier may comprise a storage medium, such as a ROM, for example a CD ROM or a semiconductor ROM, or a magnetic recording medium, for example a floppy disk or hard disk. Further, the carrier may be a transmissible carrier such as an electrical or optical signal which may be conveyed via electrical or optical cable or by radio or other means.

Embodiments of the invention have been described with particular reference to the examples illustrated. However, it will be appreciated that variations and modifications may be made to the examples described within the scope of the present invention.

The invention claimed is:

1. A computer-implemented method of analysing symbols in a computer system, including a computer, the symbols conforming to a specification for the symbols, the specification having been codified into a set of computer-readable rules, the method comprising:
   analyse the symbols using the computer-readable rules to obtain patterns of the symbols by:
   determining, a computer, a path that is taken by each of the symbols through the rules that successfully terminates, and
   grouping the symbols according to said path.

2. A method according to claim 1, wherein the method is carried out on new symbols to determine whether the new symbols fit a pattern of symbols that is known or constitute a new pattern of symbols.

3. A method according to claim 1, wherein the method is initially carried out on training examples of symbols.

4. A method according to claim 1, wherein it is determined to be sufficient to take only a single said path that successfully terminates.

5. A method according to claim 1, wherein:
   the specification is codified by defining a first order logic that describes the specification; and,
   the symbols are analysed using the first order logic to obtain patterns of the symbols by:
   determining a path that is taken by each symbol through the first order logic that successfully terminates, and
   grouping the symbols according to said paths.

6. A method according to claim 5, wherein the first order logic has clauses at least some of which are parameterised.

7. A method according to claim 6, wherein at least some of the clauses have a head that is parameterised, the determining step in the analysing step being carried out by determining a path of clauses having a parameterised head through the first order logic that is taken by each symbol that successfully terminates.

8. A method according to claim 5, wherein the first order logic is a stochastic logic program having at least some clauses that are instrumented, the determining step in the analysing step being carried out by determining a path of said instrumented clauses through the first order logic that is taken by each symbol that successfully terminates.

9. A method according to claim 1, wherein:
   the specification is codified into a Java program; and,
   the symbols are analysed using the Java program to obtain patterns of the symbols by:
   determining an execution path that is taken by each symbol through the Java program that successfully terminates, and
   grouping the symbols according to said execution paths.

10. A method according to claim 1, wherein the symbols are messages of a computer language, said specification being the computer language, and wherein the codifying the specification into a set of computer-readable rules comprises defining computer-readable rules that describe the grammar of the computer language.

11. A method according to claim 1, wherein the symbols are data.

12. A method according to claim 1, comprising generalising the symbols by generalising to the paths.

13. A method according to claim 1, comprising: prior to the analysing, codifying the specification into the set of computer-readable rules.

14. A non-transitory computer program stored on a computer-readable medium, the computer program being for analysing symbols in a computer system, the symbols conforming to a specification for the symbols, the specification having been codified into a set of computer-readable rules, the computer program comprising program instructions for causing a computer to carry out a method of:
   analysing the symbols using the computer-readable rules to obtains patterns of the symbols by:
   determining a path that is taken by each of the symbols through the rules that successfully terminates, and
   grouping the symbols according to said path.

15. A non-transitory computer program according to claim 14, wherein the computer program is arranged so that the method is carried out on new symbols to determine whether the new symbols fit a pattern of symbols that is known or constitute a new pattern.

16. A non-transitory computer program according to claim 14, wherein the computer program is arranged so that the method is initially carried out on training examples of symbols.

17. A non-transitory computer program according to claim 14, wherein the computer program is arranged so that it is determined to be sufficient to take only a single said path that successfully terminates.

18. A non-transitory computer program according to claim 14, wherein the computer program is arranged so that:
the specification is codified by defining a first order logic that describes the specification; and,
the symbols are analysed using the first order logic to obtain patterns of the symbols by:
determining a path that is taken by each symbol through the first order logic that successfully terminates, and
grouping the symbols according to said paths.

19. A non-transitory computer program according to claim 18, wherein the computer program is arranged so that the first order logic has clauses at least some of which are parameterised.

20. A non-transitory computer program according to claim 19, wherein the computer program is arranged so that at least some of the clauses have a head that is parameterised, the determining step in the analysing step being carried out by determining a path of clauses having a parameterised head through the first order logic that is taken by each symbol that successfully terminates.

21. A non-transitory computer program according to claim 18, wherein the computer program is arranged so that the first order logic is a stochastic logic program having at least some clauses that are instrumented, the determining step in the analysing step being carried out by determining a path of said instrumented clauses through the first order logic that is taken by each symbol that successfully terminates.

22. A non-transitory computer program according to claim 14, wherein the computer program is arranged so that:
the specification is codified into a Java program; and,
the symbols are analysed using the Java program to obtain patterns of the symbols by:
determining the execution path that is taken by each symbol through the Java program that successfully terminates, and
grouping the symbols according to said execution paths.

23. A non-transitory computer program according to claim 14, wherein the symbols are messages of a computer language, said specification being the computer language, and wherein the computer program is arranged so that the codifying the specification into a set of computer-readable rules comprises defining computer-readable rules that describe the grammar of the computer language.

24. A non-transitory computer program according to claim 14, wherein the symbols are data.

25. A non-transitory computer program according to claim 14, wherein the computer program is arranged so that the symbols are generalised by generalising to the paths.

26. A non-transitory computer program according to claim 14, the computer program comprising program instructions for causing a computer to codify the specification into the set of computer-readable rules prior to the analysing.

* * * * *

UNITED STATES PATENT AND TRADEMARK OFFICE
CERTIFICATE OF CORRECTION

PATENT NO. : 7,983,900 B2  
APPLICATION NO. : 12/187104  
DATED : July 19, 2011  
INVENTOR(S) : Moyle Page 1 of 1

It is certified that error appears in the above-identified patent and that said Letters Patent is hereby corrected as shown below:

Title Pg, Item (56) in column 2, under "Other Publications" line 8-9, delete "Intelliegence" and insert -- Intelligence --, therefor.

On Title Pg, Item (57) in column 2, under "Abstract", line 6, delete "obtains" and insert -- obtain --, therefor.

In column 4, line 49, delete "obtains" and insert -- obtain --, therefor.

In column 12, line 30, before "query_specification//0," delete ".".

In column 15, line 58, in Claim 1, after "determining," insert -- using --.

In column 16, line 55, in Claim 14, delete "obtains" and insert -- obtain --, therefor.

Signed and Sealed this  
Twenty-second Day of November, 2011

David J. Kappos  
*Director of the United States Patent and Trademark Office*